United States Patent [19]

Wakabayashi et al.

[11] Patent Number: 4,910,255
[45] Date of Patent: Mar. 20, 1990

[54] CURABLE COMPOSITION

[75] Inventors: Hiroshi Wakabayashi; Katsuhiko Isayama, both of Hyogo, Japan

[73] Assignee: Kanegafuchi Kagaku Kogyo Kabushiki Kaisha, Osaka, Japan

[21] Appl. No.: 187,140

[22] Filed: Apr. 28, 1988

[30] Foreign Application Priority Data

Jul. 21, 1987 [JP] Japan .................. 62-182810
Oct. 15, 1987 [JP] Japan .................. 62-260374

[51] Int. Cl.$^4$ .................................. C08F 8/00
[52] U.S. Cl. ......................... 525/100; 525/104; 525/106; 528/32; 526/279
[58] Field of Search .......... 525/100, 104, 106; 526/279; 528/32

[56] References Cited

U.S. PATENT DOCUMENTS 4,444,974 4/1984 Takase et al. ............ 528/33
4,593,068 6/1986 Hirose et al. ............ 525/100
4,689,369 8/1987 Ishino et al. ............ 525/100

FOREIGN PATENT DOCUMENTS 0108946 5/1984 European Pat. Off.

OTHER PUBLICATIONS

Rochow, An Introduction to the Chemistry of the Silicones, John Wiley & Sons, N.Y., pp. 12-13 (1946).

Primary Examiner—Melvyn I. Marquis
Attorney, Agent, or Firm—Armstrong, Nikaido, Marmelstein, Kubovcik & Murray

[57] ABSTRACT

A curable composition. The composition contain (A) a copolymer that has silicon-containing functional groups capable of crosslinking by forming siloxane bonds and whose molecular chain consists substantially of:

(1) an alkyl acrylate ester monomeric unit and/or an alkyl methacrylate ester monomeric unit, the alkyl of each being 1 to 8 carbon atoms; and
(2) an alkyl acrylate ester monomeric unit and/or an alkyl methacrylate ester monomeric unit, the alkyl of each being at least 10 carbon atoms;

(B) an oxyalkylene polymer having silicon-containing functional groups that are capable of crosslinking by forming siloxane bonds; and (C) at least one compound selected from
(i) a hydrolyzable organic silane monomer represented by the formula (I):

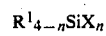

$$R^1{}_{4-n}SiX_n$$

wherein X is a hydrolyzable group, $R^1$ is a monovalent organic group having 1 to 18 carbon atoms, n is an integer of 1 to 4, and each $R^1$ or X can be the same or different when two or more $R^1$ or X groups are attached, (ii) a partial hydrolysis condensate of the organic silane monomer represented by the formula (I), and (iii) an orthoorganic acid ester represented by the formula (II):

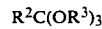

$$R^2C(OR^3)_3$$

wherein $R^2$ is hydrogen or methyl, $R^3$ is a monovalent organic group having 1 to 8 carbon atoms, and the three $R^3$ groups do not need to be the same.

7 Claims, No Drawings

CURABLE COMPOSITION

BACKGROUND OF THE INVENTION

The present invention relates to a curable composition containing two or more curable polymers. More specifically, it relates to a curable composition that contains an acrylic acid ester based and/or methacrylic acid ester based curable polymer, and a curable oxyalkylene polymer, and which has superior mechanical properties, transparency, storage stability and weather resistance. In the following description, an acrylic acid ester and/or methacrylic acid ester is referred to as a (meth)acrylic acid ester.

The present inventors previously found that a (meth)acrylic acid ester based polymer having silicon-containing functional groups that are capable of crosslinking by forming siloxane bonds either at terminals or at side chains (these types of silicon-containing functional groups are hereinafter referred to as reactive silicon functional groups) crosslinks at normal temperatures by reacting with moisture, particularly moisture in the air, to form a network structure, thereby yielding a cured product having good properties such as high weather resistance, hardness nd water resistance. The present inventors completed an invention based on this finding and filed a Japanese patent application (OPI) No. 36395/79 ((OPI) is hereinafter intended to mean unexamined published Japanese patent application).

Oxyalkylene polymers having reactive silicon functional groups have been proposed in many patents such as U.S. Pat. Nos. 3,971,751, 3,979,384 and 4,323,488, Japanese Patent Publication Nos. 36319/70, 12154/71, 32673/74, and Japanese Patent Application (OPI) Nos. 156599/75, 73561/76, 6096/79, 82123/80, 123620/80, 125121/80, 131022/80, 135135/80 and 137129/80.

The prior art (meth)acrylic acid ester based polymers containing reactive silicon functional groups have superior performance but, on the other hand, the cured products thereof are brittle and even with resin compositions having low glass transition points, the cure products have poor tensile characteristics as manifested by low tensile elongation and a concurrently occurring significant decrease in strength.

The cured products of oxyalkylene polymers having reactive silicon functional groups possess superior tensile characteristics but there is still a need to achieve further improvements in their characteristics. In addition, all of the known oxyalkylene polymers having reactive silicon functional groups are defective in their performance i that because of the structure of the backbone chains and other factors, they do not possess satisfactory weather resistance and fail to produce an adequate bond with various adherends.

Several methods have been proposed as techniques that are capable of eliminating the defects of the prior art oxyalkylene polymers having reactive silicon functional groups. In the method disclosed in U.S. Pat. No. 4,593,068, an oxyalkylene polymer having reactive silicon functional groups is blended with a (meth)acrylic acid ester based polymer optionally, having reactive silicon functional groups. This method is effective to some extent in improving the initial performance of the oxyalkylene polymer having reactive silicon functional groups but it is not easy to obtain a sufficiently compatible composition having good transparency and good storage stability.

The present inventors found, s a sufficiently compatible composition containing an oxyalkylene polymer having reactive silicon functional groups and a (meth)acrylic acid ester polymer, a curable composition comprising:

(A) a copolymer that has reactive silicon functional groups and whose molecular chain consists substantially of;
(1) alkylacrylate ester monomeric units and/or alkyl methacrylate ester monomeric units, each having a short chain alkyl group with 1 to 8 carbon atoms; and
(2) an alkyl acrylate ester monomeric unit and/or an alkyl methacrylate ester monomeric unit, each having a long chain alkyl group with at least 10 carbon atoms; and ,
(B) an oxyalkylene polymer having reactive silicon functional groups (U.S. Ser. No. 07/112,979, now abandoned, and EPC Patent Application No. 87115834.1).

This composition has good transparency and good storage stability (even if the composition is stored for a long period of time separation into two layers and an increase in viscosity do not occur), because the compatibility between the oxyalkylene polymer and the (meth)acrylate polymer is sufficiently high. Furthermore the composition provides a cured product which has superior tensile characteristics, adhesion strength and weather resistance over those of the oxyalkylene polymer and the (meth)acrylate polymer.

An object of the present invention is to further improve the transparency and storage stability of a composition containing the oxyalkylene polymer and the (meth)acrylate polymer.

SUMMARY OF THE INVENTION

The present invention relates to a curable composition that comprises:

(A) a copolymer that has silicon-containing functional groups capable of crosslinking by forming siloxane bonds and whose molecular chain consists substantially of:
(1) alkyl acrylate ester monomeric units and/or alkyl methacrylate ester monomeric units, each unit having an alkyl group of 1 to 8 carbon atoms; and
(2) alkyl acrylate ester monomeric units an//or alkyl methacrylate ester monomeric units, each unit having an alkyl group of at least 10 carbon atoms;
(B) an oxyalkylene polymer having silicon-containing functional groups that are capable of crosslinking by forming siloxane bonds; and
(C) at least one compound selected from
(i) a hydrolyzable organic silane monomer represented by the general formula (I):

$$R^1{}_{4-n}SiX_n \qquad (I)$$

(wherein X is a hydrolyzable group. $R^1$ is a monovalent organic group having 1 to 18 carbon atoms, n is an integer of 1 to 4, and each $R^2$ or X can be the same or different when two or more $R^1$ or X groups are attached),
(ii) a partial hydrolysis condensate of the organic silane monomer represented by the general formula (I), and
(iii) an orthoorganic acid ester represented by the general formula (II):

$$R^2C(OR^3)_3 \qquad (II)$$

(wherein $R^2$ is a hydrogen atom or a methyl group, $R^3$ is a monovalent organic group having 1 to 8 carbon atoms, and each $R^3$ can be the same or different).

As compared with a composition containing an oxyalkylene polymer having reactive silicon groups and a (meth)acrylate polymer, but not containing the component (C), the composition of the present invention has good transparency and good storage stability. Furthermore, a cured product of the composition of the present invention is superior in tensile characteristics, adhesion strength, transparency and weather resistance over a cured product of the oxyalkylene polymer, a cured product of the (meth)acrylate polymer, or a cured product of a mixture of the two polymers.

Although the reason for the superior properties is not clear, it is considered that the long chain alkyl group in the (methacrylate polymer used in the present invention and the component (C) improve the compatibility between the (meth)acrylate polymer having reactive silicon groups and the alkylene oxide polymer having reactive silicon groups, permitting them to cross-link more uniformly, that is, the superior properties are due to the formation of a certain IPN (Interpenetrating Polymer Network) (see *Polymer Alloy*, page 338 (edited by Koubunshi Gakkai)).

DETAILED DESCRIPTION OF THE INVENTION

The curable copolymer which is used as component (A) in the present invention [this copolymer is hereinafter referred to as copolymer (A)] consists substantially of alkyl (meth) acrylate ester monomeric units (1) having an alkyl group of 1 to 8 carbon atoms and alkyl (meth)acrylate ester monomeric units (2) having an alkyl group of at least 10 carbon atoms. The monomeric unit (1) is represented by general formula (III):

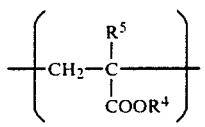  (III)

where $R^4$ is an alkyl group of 1 to 8 carbon atoms; and $R^5$ is a hydrogen atom or a methyl group. The monomeric unit (2) is represented by general formula (IV):

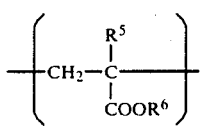  (IV)

where $R^5$ is the same as defined above; and $R^6$ is an alkyl group having at least 10 carbon atoms.

Examples of $R^4$ in the general formula (III) include alkyl groups having 1 to 8, preferably 1 to 4, and more preferably 1 and 2 carbon atoms such as methyl, ethyl, propyl, n-butyl, t-butyl and 2-ethylhexyl. The monomeric units (III) in copolymer (A) can be the same or different.

Examples of $R^6$ in the general formula (IV) include long chain alkyl groups having at least 10, typically 10 to 30, and preferably 10 to 20, carbon atoms such as lauryl, tridecyl, cetyl, stearyl and behenyl (alkyl of 22 carbon atoms). The monomeric units (IV) in copolymer (A) can be the same or different.

The molecular chain of the copolymer (A) is substantially composed of the monomeric units (1) and (2) The term "substantially" means that the sum of the monomeric units (1) and (2) present in copolymer (A) exceeds 50 wt % of said copolymer. The sum of the two monomeric units is preferably at least 70 wt % of the copolymer (A).

The weight ratio of monomeric units (1) to monomeric units (2) is preferably in the range of 95:5 to 40:60, more preferably in the range of 90:10 to 60:40.

The copolymer (A) may contain monomeric units in addition to the monomeric units (1) and (2) and examples of such optionally present monomeric units include: monomeric units derived from such compounds as carboxylic-containing monomers such as acrylic acid and methacrylic acid; amide-containing monomers such as acrylamide, methacrylamide, N-methylol acrylamide and N-methylol methacrylamide; epoxy-containing monomers such as glycidyl acrylate and glycidyl methacrylate; amino-containing monomers such as diethylaminoethyl acrylate, diethylamino ethyl methacrylate and aminoethyl vinyl ether; and monomeric units derived from such compounds as acrylonitrile, styrene, α-methylstyrene, alkylvinyl ether, vinyl chloride, vinyl acetate, vinyl propionate, and ethylene.

From the viewpoint of ease of handling, the copolymer (A) preferably has a number average molecular weight of 500 to 100,000, especially 1,000 to 75,000.

The reactive silicon functional groups in copolymer (A), or the silicon-containing functional groups that are capable of crosslinking by forming siloxane bonds, are well known in the art and are characterized by their ability to crosslink even at room temperature. Typical examples of such reactive silicon functional groups are represented by general formula (V):

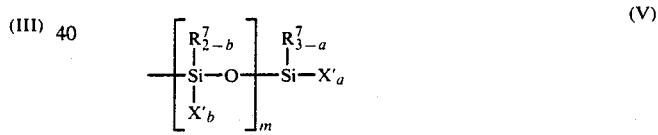  (V)

where $R^7$ is a substituted or unsubstituted monovalent organic group having 1 to 20 carbon atoms or a triorganosiloxy group which may be the same or different; X' is a hydroxyl group or a hydrolyzable group; a is 0 or an integer of 1, 2 or 3; b is 0, 1 or 2, with the proviso that $1 \leq a+mb$, and preferably $1 \leq a+mb \leq 4$; and m is 0 or an integer of 1 to 18, however, not all of the m units

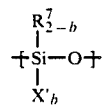

are necessarily the same.

Reactive silicon functional groups which are preferred for such reasons as economy are represented by general formula (VI):

  (VI)

where $R^7$, X' and a are the same as defined above.

In order to ensure satisfactory curability, the copolymer (A) preferably contains at least 1, more preferably at least 1.1, and most preferably at least 1.5 reactive silicon functional groups on average. Preferably, the copolymer (A) contains an apparent number average molecular weight of 300 to 8,000, preferably 500 to 5,000, per reactive silicon functional group.

Specific examples of the hydrolyzable group X' in formula (V) include a halogen atom, a hydrogen atom, an alkoxy group, an acyloxy group, a ketoximate group, an amino group, an amido group, an aminooxy group, a mercapto group and an alkenyloxy group. Among these examples, alkoxy groups such as methoxy and ethoxy are preferred since they will undergo mild hydrolysis.

Specific examples of $R^7$ in formula (V) include alkyl groups having 1 to 20 carbon atoms such as methyl and ethyl, cycloalkyl groups having 3 to 20 carbon atoms such as cyclohexyl, aryl groups having 6 to 20 carbon atoms such as phenyl, and aralkyl groups having 7 to 20 carbon atoms such as benzyl. In formula (V) or (VI), $R^7$ may be a triorganosiloxy group represented by the following formula:

$(R')_3SiO-$

R' is a substituted or unsubstituted monovalent organic group, preferably hydrocarbon groups having 1 to 20 carbon atoms, such as methyl group, phenyl group, etc., provided that the three R' are not necessarily the same. A particularly preferred example of $R^7$ in formula (V) or (VI) is methyl.

The copolymer (A) used in the present invention can be prepared by vinyl polymerization, for example, vinyl polymerization initiated by radical reaction in solution polymerization, bulk polymerization or any other conventional polymerization procedure f monomers that provide the units represented by formulae (III) and (IV).

The polymerization is carried out by reacting the necessary monomers and optional additives such as a radical initiator at 50° to 150° C., preferably in the presence of a chain transfer agent, such as n-dodecyl mercaptan or t-dodecyl mercaptan, which is optionally employed in order to attain a copolymer (A) having a number average molecular weight of 500 to 100,000. A solvent may or may not be used and if it is used, it is preferably selected from among non-reactive solvents such as ethers, hydrocarbons and acetate esters.

Reactive silicon functional groups may be introduced into the copolymer (A) by various methods such as: (a) a method wherein a compound such as $CH_2=CHSi(OCH_3)_3$ that has polymerizable unsaturated bonds and reactive silicon functional groups is added to monomers that provide the units represented by formulae (III) and (IV) and the individual monomers are copolymerized; and (b) a method wherein a compound such as acrylic acid having polymerizable unsaturated bonds and reactive functional groups (hereinafter abbreviated as Y groups) is added to monomers that provide the units represented by formulae (III) and (IV) and thereafter, the resulting copolymer is reacted with a compound that has functional silicon groups and functional groups capable of reacting with the Y groups (the latter functional groups are hereinafter abbreviated as Y' functional groups), such as a compound having both an isocyanate group and the group $-Si(OCH_3)_3$.

An example of the compound having polymerizable unsaturated bonds and reactive silicon functional groups may be represented by general formula (VII):

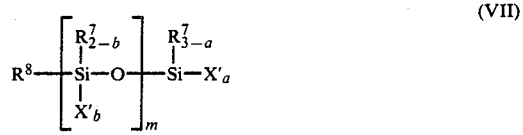
(VII)

where $R^8$ is a residual organic group having a polymerizable unsaturated bond; and $R^7$, X', a, b and m are each the same as defined above. A preferred example of the compound of formula (VII) is represented by general formula (VIII):

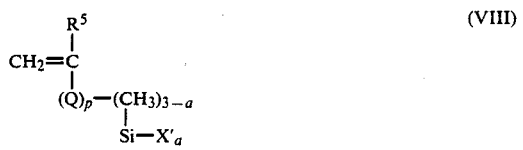
(VIII)

where $R^5$, X' and a are each the same as defined above; Q is a divalent organic group such as $-COOR^9-$ (where $R^9$ is a divalent alkylene group having 1 to 6 carbon atoms such as $-CH_2-$ or $-CH_2CH_2-$, $-CH_2C_6H_5CH_2CH_2-$, $-CH_2OCOC_6H_4COO(CH_2)_3-$; and p is 0 or 1.

Specific examples of the compounds represented by formulae (VII) and (VIII) are listed below

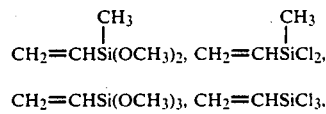

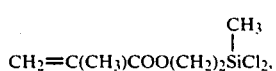

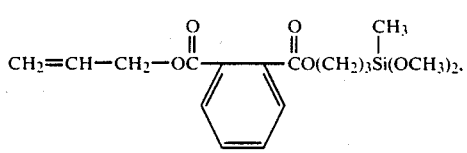

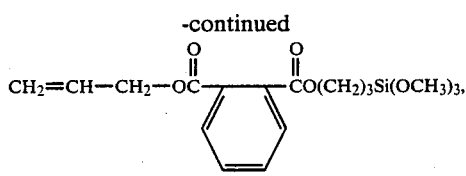

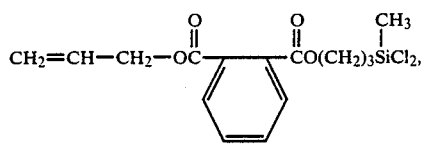

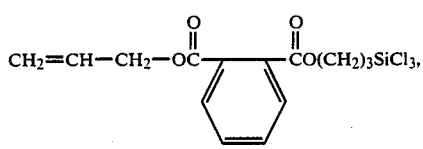

These silane compounds can be synthesized by various methods, one of which comprises reacting a compound such as acetylene, allyl acrylate, allyl methacrylate or diallyl phthalate with a compound such as methyl dimethoxysilane or methyl dichlorosilane in the presence of a catalyst made of a transition metal of Group VIII of the Periodic Table. An effective catalyst may be formed of a complex compound of a metal of Group VIII selected from platinum, rhodium, cobalt, palladium and nickel. Particularly preferred complex compounds are platinum based, such as platinum black, chloroplatinic acid, platinum alcohol complex, platinum-olefin complex, platinum-aldehyde complex, and platinum-ketone complex.

Method (b) that can be employed to introduce reactive silicon functional groups into copolymer (A) is hereinafter described with reference to an illustrative example. While various combinations of groups may be employed as Y and Y' groups, a vinyl group and a hydrosilicon group

may respectively be used. The Y and Y' groups are of bonding to each other through a hydrosilylation reaction. Examples of the compound that has not only a vinyl group as the Y group but also a polymerizable unsaturated bond are listed below: allyl acrylate, allyl methacrylate, diallyl phthalate, neopentyl glycol diacrylate, neopentyl glycol dimethacrylate, 1,5-pentanediol diacrylate, 1,5-pentanediol dimethacrylate, 1,6-hexanediol diacrylate, 1,6-hexanediol dimethacrylate, polyethylene glycol diacrylate, polyethylene glycol dimethacrylate, polypropylene glycol diacrylate, polypropylene glycol dimethacrylate, divinylbenzene, and butadiene.

A typical example of the compound having not only a hydrosilicon group as the Y' group but also a reactive silicon functional group may be a hydrosilane compound represented by general formula (IX):

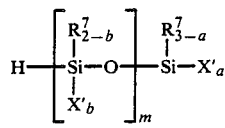

where $R^7$, X', a, b and m are each the same as defined above.

The hydrosilane compounds of formula (IX) may be exemplified but are in no way limited by the following: halogenated silanes such as trichlorosilane, methyldichlorosilane, dimethylchlorosilane and trimethylsiloxydichlorosilane; alkoxysilanes such as trimethoxysilane, triethoxysilane, methyl dimethoxysilane, phenyl dimethoxysilane, and 1,3,3,5,5,7,7-heptamethyl-1,1-dimethoxytetrasiloxane; acyloxysilanes such as methyl diacetoxysilane and trimethylsiloxymethyl acetoxysilane; ketoximate silanes such as bis(dimethylketoximate)methylsilane, bis(cyclohexylketoximate)methylsilane, and bis(diethylketoximate)trimethylsiloxysilane; hydrosilanes such as dimethylsilane, trimethylsiloxysilane and 1,1-dimethyl-2,2-dimethyldisiloxane; and alkenyloxysilanes such as methyl di(isopropenyloxy)silane.

For reaction with a C=C bond, the hydrosilane compound may be used in any amount with respect to the C=C bond but is preferably used in an amount of 0.5 to 2.0 moles per mole of the C=C bond. A greater amount of silane may be employed, however, any excess silane will be simply recovered as unreacted hydrosilane.

The reaction between the hydrosilane compound and the C=C bond requires a catalyst made of the aforementioned complex of a transition metal of group VIII. This hydrosilylation reaction is accomplished at any temperature between 50° and 130° C. and the reaction time generally ranges from about 1 to 10 hours.

Halogenated silanes which are inexpensive and highly reactive e stock materials may be readily employed as hydrosilane compounds.

If halogenated silanes are used, the resulting copolymer (A), when exposed to the air, will rapidly cure at normal temperatures while releasing hydrogen chloride. Since the released hydrogen chloride will produce an irritating odor or cause corrosion, the crude product can be used in only limited practical applications. It is therefore preferable to convert the bonded halogen atom to a suitable hydrolyzable group or hydroxyl group. Illustrative hydrolyzable groups include alkoxyl, acyloxy, aminoxy, phenoxy, thioalkoxy and amino groups.

Specific methods for converting a halogen atom to an alkoxy group are described below:

(1) reacting the halogen atom with an alcohol such as methanol, ethanol, 2-methoxyethanol, sec-butanol or tert-butanol, or with a phenol;

(2) reacting the halogen atom with an alkali metal salt of an alcohol or a phenol; and (3) reacting the halogen atom with an alkyl orthoformate such as methyl orthoformate or ethyl orthoformate.

Specific methods for converting a halogen atom to an aminoxy group are described below:

(1) reacting the halogen atom with a carboxylic acid such as acetic acid, propionic acid or benzoic acid; and (2) reacting the halogen atom with an alkali metal salt of a carboxylic acid.

Specific methods for converting a halogen atom to an aminoxy group are described below:

(1) reacting the halogen atom with a hydroxylamine such as N,N-dimethylhydroxylamine, N,N-diethylhydroxylamine, N,N-methylphenylhydroxylamine or N-hydroxypyrrolidine; and (2) reacting the halogen atom with an alkali metal salt of a hydroxylamine.

Specific methods for converting a halogen atom to an amino group are described below:

(1) reacting the halogen atom with a primary or secondary amine such as N,N-dimethylamine or N,N-methylphenylamine or pyrrolidine; and (2) reacting the halogen atom with an alkali metal salt of a primary or secondary amine.

Specific methods for converting a halogen atom to a thioalkoxy group are listed below:

(1) reacting the halogen atom with a thioalcohol such as ethyl mercaptan, or with a thiophenol; and (2) reacting the halogen atom with an alkali metal salt of a thioalcohol or a thiophenol.

As described above, the halogen atom on the silyl group introduced into the C=C bond by a hydrosilylation reaction can be converted to another hydrolyzable group. In addition, other groups such as alkoxy or acyloxy in the introduced silyl group may also be converted to a hydrolyzable group (e.g. amino or aminoxy) or a hydroxyl group.

When hydrolyzable groups on the silyl group that is directly introduced by a hydrosilylation reaction are converted to other hydrolyzable groups, a temperature in the range of 50° to 150° C. is suitably employed. This conversion reaction may be performed with or without a solvent. If a solvent is to be used, an inert solvent such as an ether, a hydrocarbon or an acetate ester is used with advantage.

An oxyalkylene polymer having reactive silicon functional groups in its molecule [this polymer is hereinafter referred to as oxyalkylene polymer (B)] is also used in the present invention, and examples of oxyalkylene polymer (B) are proposed in many patents such as U.S. Pat. Nos. 3,971,751, 3,979,384, and 4,323,488, Japanese Patent Publication Nos. 36319/70, 12154/71 and 32673/74, as well as n Japanese Patent Application (OPI) Nos. 156599/75, 73561/76, 6096/79, 82123/80, 123620/80, 125121/80, 131022/80, 135135/80 and 137129/80, incorporated herein by references.

The molecular chain of oxyalkylene polymer (B) preferably has a recurring unit that is represented by the general formula:

$$-R^{10}-O-$$

where $R^{10}$ is a divalent hydrocarbon group having 1 to 8 carbon atoms, preferably a hydrocarbon group having 3 or 4 carbon atoms. It is preferable that the sum of the recurring units: $-R^{10}-O-$ in oxyalkylene polymer (B) exceeds 50 wt %, specifically 70 wt % of said polymer. Specific examples of $R^{10}$ include:

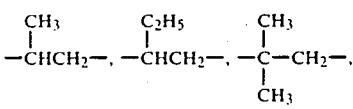

$-CH_2CH_2CH_2CH_2-$, etc.

The molecular chain of the oxyalkylene polymer may be composed of recurring units of a single type or two or more different types. A particularly preferred example of $R^{10}$ is

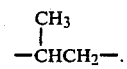

The reactive silicon functional groups in the oxyalkylene polymer (B) ar the same as already defined.

In order to attain adequate curability, the oxyalkylene polymer (B) preferably contains at least 1, more preferably at least 1.1, and most preferably at least 1.5, reactive silicon functional groups, on average. Such reactive silicon functional groups are preferably present at terminals of the molecular chain of the oxyalkylene polymer (B).

The oxyalkylene polymer (B) has a number average molecular weight which preferably ranges from 500 to 30,000, more preferably from 3,000 to 15,000. Oxyalkylene polymers (B) may be used either alone or in combination.

The oxyalkylene polymer (B) may be prepared by performing an addition reaction between a hydrogenated silicon compound of formula (IX) and a polyether having an olefin group represented by general formula (X):

(where $R^{11}$ is a hydrogen atom or a monovalent organic group having 1 to 20 Carbon atoms; $R^{12}$ is a divalent organic group having 1 to 20 carbon atoms; c is 0 or 1) in the presence of a catalyst made of a metal of group VIII such as platinum.

Other methods for preparing the oxyalkylene polymer (B) are described below:

(1) reacting a hydroxyl-terminated polyoxyalkylene with a polyisocyanate compound such as toluene diisocyanate to form an isocyanate-terminated alkylene oxide polymer, and subsequently reacting the terminal isocyanate group with a W group in a silicon compound represented by general formula (XI):

where W is an active hydrogen containing group selected from among a hydroxyl group, a carboxyl group, a mercapto group and an amino group (primary or secondary); and a, $R^7$, $R^{12}$ and $X'$ are each the same as defined above);

(2) performing an addition reaction between an olefin group in an olefin-containing polyoxyalkylene represented by formula (VIII) and a mercapto group in a silicon compound of formula (IX) where W is a mercapto group; and (3) reacting a hydroxyl group in a hydroxyl-terminated polyoxyalkylene with a compound represented by general formula (X):

where $R^7$, $R^{12}$, $X'$ and a are each the same as defined above. It should, however, be noted that the Oxyalkylene polymer (B) may be prepared by other methods.

In the preparation of oxyalkylene polymer (B) part or all of $X'$ groups in the reactive silicon functional group may be converted to other hydrolyzable groups or a hydroxyl group. If $X'$ group is a halogen atom or hydrogen atom, it is preferably converted to an alkoxy, acyloxy, aminoxy, alkenyloxy, hydroxyl group or some other group. In formula (X), $R^{11}$ is a hydrogen atom or a substituted or unsubstituted monovalent organic group having 1 to 20 carbon atoms, and is preferably a hydrogen atom or a hydrocarbon group, with the former being particularly preferred. In formula (X), $R^{12}$ is a divalent organic group having 1 to 20 carbon atoms and is preferably $-R^{13}-$, $-R^{13}OR^{13}-$,

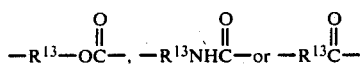

(where $R^{13}$ is a hydrocarbon group having 1 to 10 carbon atoms), with a methylene group being particularly preferred. The olefin-containing alkylene oxide polymer may be prepared by various methods such as the one disclosed in Unexamined Published Japanese Patent Application (OPI) No. 6097/79 and a method in which an epoxy compound such as ethylene oxide or propylene oxide is polymerized with an olefin-containing epoxy compound such as allyl glycidyl ether producing an alkylene oxide polymer having an olefin group in side chain.

The component (C) to be used in the present invention is at least one compound selected from (i) a hydrolyzable organic silane monomer represented by the general formula (I):

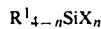

(wherein X is a hydrolyzable group, $R^1$ is a monovalent organic group having 1 to 18 carbon atoms, n is an integer of 1 to 4 and each $R^1$ or X can be the same or different when two or more $R^1$ or X groups are attached), (ii) a partial hydrolysis condensate of the organic silane monomer represented by the general formula (I), and (iii) an orthoorganic acid ester represented by the general formula (II):

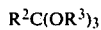

(wherein $R^2$ is a hydrogen atom or a methyl group, $R^3$ is a monovalent organic group having 1 to 8 carbon atoms, and the $R^3$s can be the same or different), and is a component to be used not only to greatly improve the performance of the cured product but also to improve viscosity stability and storage stability of the composition before curing.

In the general formula (I), $R^1$ is a monovalent organic group having 1 to 18 carbon atoms and is linked to a silicon atom through a silicon-carbon bond. Such organic groups include a monovalent hydrocarbon group having 1 to 18 carbon atoms such as methyl, ethyl, cyclohexyl, phenyl and benzyl. These organic groups and hydrocarbon groups may contain functional groups such as a halogen atom, a hydroxyl group, an alkoxy group, a nitrile group, an amino group, a mercapto group, an acid amide group, a carboxylic acid group, an epoxy group and an acryloyl group. As X, hydrolyzable groups listed as representative examples of $X'$ can be given. Of these, an alkoxy group s preferred.

h is an integer of 1 to 4, and is particularly preferably 2 or 3.

Representative examples of the organic silane monomer represented by the general formula (I) include methyltrimethoxy silane, dimethyldimethoxysilane, trimethylmethoxysilane, ethyl silicate, methyltriethoxysilane, dimethyldiethoxysilane, methyltriethoxysilane, phenyltrimethoxysilane, diphenyldimethoxysilane, triphenylmethoxysilane, phenyltriethoxysilane, diphenyldiethoxysilane, vinyltriacetoxysilane, methyltri(methylethylketoxymate)silane, methyltri(dimethylamino)silane, methyltri(N,N-methylethylaminoxy)silane, methyltri(N-methyl-N-acetylamino)silane, methyltri(isopropenoxy)silane, vinyltrimethoxysilane, vinyltriethoxysilane, γ-methacryloxypropyltrimethoxysilane, γ-methacryloxypropylmethyldimethoxysilane, methyltriacetoxysilane, γ-mercaptopropyltriethoxysilane, γ-glycidoxypropyltrimethoxysilane, γ-aminopropyltriethoxysilane, γ-aminopropyltrimethoxysilane, N-(2-aminoethyl)-γ-aminopropyltrimethoxysilane, N-(2-aminoethyl -γ-aminopropylmethyldimethoxysilane, N-(2aminoethyl)aminomethyltrimethoxysilane, dimethoxymethyl-3-pyperazinopropylsilane, 3-piperazinopropyltrimethoxysilane, N-(3-triethoxysilylpropyl)urea, N-phenyl-γ-aminopropyltrimethoxysilane and the like, although the present invention is not limited thereto. In addition, partial hydrolysis condensates of the above organic silane monomers can be used as the component (C).

Of these, amino group-substituted alkoxysilane ssuch as N-(2-aminoethyl)-γ-aminopropyltrimethoxysilane, γ-aminopropyltriethoxysilane, N-(2-aminothyl)-γ-aminopropylmethyldimethoxysilane and the like, or their partial hydrolysis condensates are preferred. For example, when an amino group-substituted alkoxysilane is used, the effect of improving adhesion properties is marked, and the composition can be used as an adhesive without use of a primer. When the composition is used as an adhesive, there can be obtained a cured product which is good in water resistance and moisture resistance, and further which has a high strength. Furthermore, as described above, compatibility of a curable composition is improved, layer-separation and an increase in viscosity during storage do not occur easily, and a cured product which is good in transparency and is uniform can be stabilized for a long period of time.

Representative examples of the orthorganic acid esters represented by the general formula (II) include orthoformic acid ester such as methyl orthoformate and ethyl orthoformate, orthoacetic acid ester such as methyl orthoacetate and ethyl orthoacetate and the like, although the present invention is not limited thereto.

A cross-link accelerator may be added to the composition of the present invention, if necessary.

Examples of the curing accelerator include, for example, organotin compounds, acidic phosphate ester compounds, the products of reaction between acidic phosphate ester compounds and amines, saturated or unsaturated polyvalent carboxylic acids or acid anhydrides thereof, and organic titanate compounds.

Illustrative organotin compounds include dibutyltin dilaurate, dioctyltin dimaleate, dibutyltin phthalate, tin octylate and dibutyltin methoxide.

The acidic phosphate ester compounds are those containing a portion represented by

and may be more specifically represented by

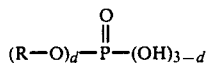

(where d is 1 or 2; and R is an organic residual group, preferably hydrocarbon groups having 1 to 20 carbon atoms). Examples of such organic acidic phosphate esters are listed below;

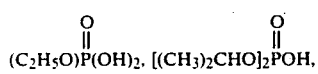

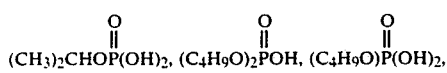

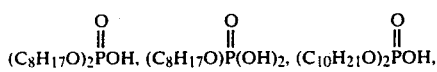

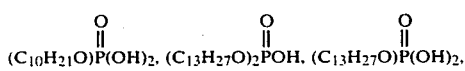

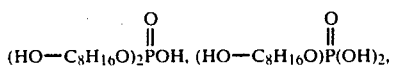

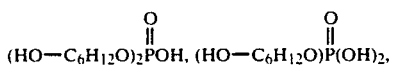

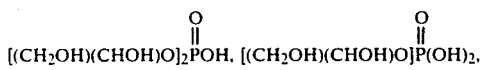

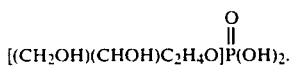

Illustrative organic titanates are titanate esters such as tetrabutyl titanate, tetraisopropyl titanate and triethanolamine titanate.

The curable composition of the present invention may further contain various components such as fillers, plasticizers and conventional additives.

Usable fillers include ground calcium carbonate, precipitated calcium carbonate, gelatinous calcium carbonate, kaolin, talc, silica, titanium oxide, aluminum silicate, magnesium oxide, zinc oxide and carbon black.

Usable plasticizers include dioctyl phthalate, butylbenzylphthalate, chlorinated paraffin and epoxidized soybean oil.

Examples of the conventional additives that can be used include antisag agents such as hydrogenated castor oil and organic bentonite, coloring agents and antioxidants.

In the curable composition of the present invention, 5 to 5,000 parts by weight of copolymer (A) are preferably used per 100 parts by weight of the oxyalkylene polymer (B) since if the proportions of (A) and (B) are within this range, a significant improvement is attained in the characteristics of the curable composition. More preferably, 5 to 2,000 parts by weight of copolymer (A) are used per 100 parts by weight of the oxyalkylene polymer (B), with suitable weight proportions of (A) and (B) being selected in accordance with the intended use and performance of the curable composition.

The amount of the component (C) used is preferably 0.1 to 100 parts, more preferably 0.5 to 20 parts by weight per 100 parts of the total of the copolymer (A) and the oxyalkylene polymer (B). If the amount of the component (C) used is less than 0.1 part, the effect of improving mechanical properties, adhesion properties, transparency, viscosity stability, storage stability and the like tends to be decreased. On the other hand, the use of the component (C) in amounts of more than 100 parts is not desirable from an economic standpoint.

The curing accelerator is preferably used in an amount of 0.1 to 20 parts by weight, more preferably 0.5 to 10 parts by weight, per 100 parts by weight of the sum of copolymer (A) and oxyalkylene polymer (B).

The composition of the present invention produces, for example, marked effects as described below.

(1) Compatibility between the copolymer (A) and the oxyalkylene polymer (B) is increased by the action of long chain alkyl groups of the (meth)acrylate consisting the copolymer (A) and the component (C) and, therefore, they are easily solubized.

(2) It is considered that reactive silicon groups react in the state that they are uniformly dissolved, thereby forming a three dimensional network.

As a result, (a) the resulting cured product exhibits superior characteristics to those expected from the performance of each polymer and the composition ratio; for example, tensile characteristics such as elongation and tensile strength, adhesion strength, weather resistance and the like (b) as compared with a composition comprising a reactive silicon group-containing (meth)acrylate polymer and a reactive silicon group-containing oxyalkylene polymer, the composition of the present invention is excellent in transparency and storage stability (in particular, turbidity during storage and two layer-separation are improved, and an increase in viscosity is prevented). Furthermore, since compatibility between polymers is good, the blend ratio can be determined freely depending on the desired hardness and, therefore, materials having a wide variety of characteristics can be obtained.

The curable composition of the present invention is useful for many purposes such as adhesives, pressure-sensitive adhesives, paints, water proofing agents, sealant compositions, templating material,, casting rubber materials and foaming materials.

If the curable composition of the present invention is to be used as a sealing material, a curing catalyst of the type described above is mixed with a formulation of the necessary components in a moisture-free condition and the blend can be stored for a prolonged period without degradation. When the blend is exposed to atmospheric moisture as required, it cures rapidly to form a good rubber elastomer. In other words, the curable composition of the present invention can be used as a one-component elastomeric sealing material which displays good weather resistance, transparency and tensile elongation.

If the curable composition of the present invention is used as a paint, it exhibits a much higher tensile elongation and weather resistance than is usually anticipated and displays excellent characteristics for use as a highly elastic paint in construction applications, or as a primer or a waterproofing agent in concrete structures.

If the curable composition of the present invention is used as a waterproofing agent, it exhibits a good balance between breaking strength and elongation while affording high durability and good resistance to water, so it is less sensitive to blistering and spalling than the products prepared by existing techniques.

If the curable composition of the present invention is used as an adhesive, it exhibits high bond strength, in particular, a good balance between peeling bond strength and shearing bond strength, and therefore holds promise for application as an adhesive in building structures.

The following synthesis examples and working examples are given for the purpose of further illustrating the present invention but are in no way to be taken as limiting.

SYNTHESIS EXAMPLES 1-7

Xylene (for its amount, see Table 1 below) was heated at 110° C. To the heated xylene, solutions having a polymerization initiator (azobisisobutyronitrile) dissolved in monomer mixtures (see Table 1) were added dropwise over a period of 6 hours. Postpolymerization was performed for 2 hours to prepare the samples of copolymer (A) shown in Table 1.

TABLE 1

|  | Synthesis Example No. | | | | | | |
|---|---|---|---|---|---|---|---|
|  | 1 | 2 | 3 | 4 | 5 | 6 | 7 |
| Monomer feed formulation (parts by weight) | | | | | | | |
| butyl acrylate | 63.5 | 445 | 9.5 | 7.4 | 66.6 | 587 | 181 |
| methyl methacrylate | 389 | 23 | 457 | 447 | 400 | — | 389 |
| stearyl methacrylate*¹ | 117 | 119 | — | 117 | 118 | — | — |
| acryester SL*² | — | — | 117 | — | — | — | — |
| trimethylolpropane trimethacrylate | — | 18.2 | — | — | 6.0 | 18.2 | — |
| TSMA*³ | 30.5 | 3.0 | 14.7 | 29.1 | KBM 502*⁶ 14.7 | 3.0 | 30.5 |
| mercaptosilane*⁴ | — | 11.8 | 12.5 | 12.0 | KBM 802*⁷ 18.0 | 11.8 | — |
| AIBN*⁵ | 12.0 | 6.0 | 43.2 | 30.0 | 6.0 | 6.0 | 12.0 |
| xylene | 255 | 110 | 262 | 257 | 257 | 110 | 255 |
| Copolymer (A) | | | | | | | |
| number average molecular weight (Mn)*⁸ | 9,700 | 9,000 | 2,400 | 3,700 | 4,500 | 8,700 | 9,500 |
| molecular weight distribution (Mw/Mn)*⁸ | 1.9 | 3.4 | 2.0 | 1.8 | 1.9 | 3.0 | 2.0 |
| conversion to polymer (%) | 99 | 99 | 98 | 100 | 98 | 100 | 99 |
| solids content in resin (%) | 70 | 85 | 70 | 70 | 70 | 85 | 70 |

*¹Acryester S ® of Mitsubishi Rayon Company Limited;
*²C₁₂-C₁₃ mixed alkyl methacrylate of Mitsubishi Rayon Company Limited;
*³γ-methacryloxypropyl trimethoxysilane;
*⁴γ-mercaptopropyl trimethoxysilane;
*⁵azobisisobutyronitrile;
*⁶γ-methacryloxypropylmethyl dimethoxysilane;
*⁷γ-mercaptopropylmethyl dimethoxysilane;
*⁸measured by GPC.

SYNTHESIS EXAMPLE 8

A pressure-resistant reactor vessel equipped with a stirrer was charged with 800 g of polyoxypropylene having an average molecular weight of 8,000 that had an allylether group introduced at 97% of all the terminals present. Thereafter, the reactor was charged with 19 g of methyldimethoxysilane and 0.34 ml of a solution of chloroplatinic acid catalyst (i.e., a solution having 8.9 g of H₂PtCl₆.6H₂O dissolved in 18 ml of isopropyl alcohol and 160 ml of tetrahydrofuran). Reaction was then carried out at 80° C. for 6 hours.

IR spectrophotometry showed that the amount of residual hydrosilicon groups in the reaction solution was negligible. Determination of silicon groups by NMR analysis showed that the reaction product was polyoxypropylene having about 1.7 units of terminal

group per molecule.

EXAMPLES 1 to 7 and COMPARATIVE EXAMPLES 1 to 7

The copolymers obtained in Synthesis Examples 1 to 7, polyoxypropylene having an average molecular weight of 8,200 and containing reactive silicon groups at the terminals thereof as obtained in Synthesis Example 8, and the component (C) shown in Table 2 were heated to 50° to 60° C. Then, the component (C) was added to a solution of the above copolymers in an amount shown in Table 2. Thereafter, polyoxypropylene having reactive silicon groups at the terminals thereof was added in portions in such a manner that they were equal in amounts in terms of solids, and they were thoroughly stirred to prepare a composition.

For each composition, viscosity just after preparation and after storage at 50° C. for 60 days were measured at 23° C. by the use of a B-type viscometer and the haze ratio (optically determined in a predetermined glass cell) was measured. The results are shown in Table 2.

TABLE 2

| Example No. | Type of Copolymer (Synthesis example Nos.) | Component (C) Type | Component (C) Amount*[12] (parts) | Before Storage Test (Just after Preparation) Viscosity (cp) | Before Storage Test (Just after Preparation) Haze Ratio (%) | 50° C. × 60 day storage Viscosity (cp) | 50° C. × 60 day storage Haze Ratio (%) |
|---|---|---|---|---|---|---|---|
| 1 | 1 | PTS-31*[9] | 5.0 | 1200 | <5 | 1240 | <5 |
| 2 | 2 | PTS-31*[9] | 3.0 | 250 | 16 | 267 | 20 |
| 3 | 3 | A-174*[10] | 2.0 | 2400 | <5 | 2200 | <5 |
| 4 | 4 | A-174*[10] | 10.0 | 1980 | <5 | 2200 | <5 |
| 5 | 5 | KBM202*[11] | 5.0 | 1300 | <5 | 1300 | <5 |
| 6 | 3 | A-1120*[13] | 3.0 | 2100 | <5 | 2200 | <5 |
| 7 | 3 | A-1100*[14] | 5.0 | 1700 | <5 | 1720 | <5 |
| Comparative Example 1 | 1 | — | — | 1120 | <5 | 3400 | 14 |
| 2 | 2 | — | — | 200 | 22 | 1200 | Layer-separation |
| 3 | 3 | — | — | 2100 | <5 | gelation | — |
| 4 | 4 | — | — | 3600 | <5 | gelation | — |
| 5 | 5 | — | — | 970 | <5 | 2600 | 80 |
| 6 | 6 | PTS-31 | 5.0 | 220 | 65 | layer-separation | — |
| 7 | 7 | — | — | two-layer separation | | two-layer sepaation | |

Remarks:
*[9]PTS-31: Phenyltrimethoxysilane produced by Daihachi Kagaku Kogyo Co., Ltd.
*[10]A-174: γ-Methacryloxypropyltrimethoxysilane produced by Nipon Yunika Co., Ltd.
*[11]KBM202: Diphenyldimethoxysilane produced by Shinetsu Silicone Co., Ltd.
*[12]Amount per 100 parts of Component (A) + Component (B).
*[13]A-1120: N—(2-aminoethyl)-γ-aminopropyltrimethoxy-silane produced by Nippon Yunika Co., Ltd.
*[14]A-1100: γ-Aminopropyltriethoxysilane produced by Nippon Yunika Co., Ltd.

As apparent from the results of Table 2, the component (C) greatly improves the stability of the composition after storage (particularly with respect to minimizing turbidity, two layer separation and increase in viscosity during storage).

EXAMPLES 8 to 9

The copolymer obtained in Synthesis Example 1 and the polyoxypropylene polymer obtained in Synthesis Example 8 were blended in such a manner that the resin solids ratio was 63/35 and 50/50 (Examples 8 and 9, respectively). To 100 parts of the blended resin, 5 parts of γ-methacryloxypropyltrimethoxysilane (A-174) and 3 parts of ethyl orthoformate were added to prepare an enamel having the formulation shown in Table 3. For this enamel, viscosity just after preparation and after storage at 50° C. for 60 days were measured in the same manner as in Example 1.

To the above enamel, dibutyl tin phthalate as a curing accelerator was added in an amount of 2.5 parts per 100 parts of the resin solids, and the resulting mixture was flow extended in such a manner that a sheet having a thickness of 0.5 to 1.0 mm was obtained and then cured and dried at room temperature for 7 days.

The coating thus formed was measured for tensile characteristics and accelerated weather resistance using a sun shine weatherometer (a rate of gloss maintained after irradiation as determined by the 60° C. mirror gloss meter method (according to JIS Z8741)).

The results are shown in Table 3.

COMPARATIVE EXAMPLES 8 to 11

The formulations shown in Table 3 were evaluated in the same manner as in Example 8. The results are shown in Table 3.

TABLE 3

| | Example No. 8 | Example No. 9 | Comparative Example No. 8 | Comparative Example No. 9 | Comparative Example No. 10 | Comparative Example No. 11 |
|---|---|---|---|---|---|---|
| Composition (parts) | | | | | | |
| Copolymer (A) of Synthesis Example 1 | 65 | 50 | 100 | 65 | 50 | — |
| Polyoxypropylene polymer (B) of Synthesis Example 8 | 35 | 50 | — | 35 | 50 | 100 |
| Titanium oxide*[15] | 40 | 40 | 40 | 40 | 40 | 40 |
| Xylene | 60 | 60 | 60 | 60 | 60 | 60 |
| Dispersion Stabilizer*[16] | 0.3 | 0.3 | 0.3 | 0.3 | 0.3 | 0.3 |
| Ultraviolet Absorber | 0.5 | 0.5 | 0.5 | 0.5 | 0.5 | 0.5 |
| Antioxidant | 0.5 | 0.5 | 0.5 | 0.5 | 0.5 | 0.5 |
| A-174 | 5.0 | 5.0 | — | — | — | — |
| Ethyl Orthoformate | 3.0 | 3.0 | — | — | — | — |
| Characteristics of Coating | | | | | | |
| Strength at Break (kg/cm$^2$) | 92 | 70 | 120 | 60 | 40 | 12 |
| Elongation at Break (%) | 290 | 780 | 2 | 210 | 350 | 120 |

TABLE 3-continued

| | Example No. | | Comparative Example No. | | | |
|---|---|---|---|---|---|---|
| | 8 | 9 | 8 | 9 | 10 | 11 |
| Gloss Mantainance Rate (%) | | | | | | |
| 500 hours after irradiation | 95 | 95 | 97 | 95 | 95 | — |
| 1,000 hours after irradiation | 90 | 90 | 90 | 87 | 87 | Serious cracking of the surface |
| 2,000 hours after irradiation | 85 | 84 | 85 Partical cracking | 80 No abnormality | 80 No abnormality | — |
| Viscosity (P) | | | | | | |
| Before Storage Test (just after preparation) | 228 | 115 | — | 240 | 136 | — |
| After 50° C. × 60 day Storage | 290 | 150 | — | gelatinization | 13000 | — |

Remarks
*[15]CR-90 (produced by Ishihara Sangyo Co., Ltd.)
*[16]Byk P104P (produced by Lincrott Corp.)

From the results of Table 3, it can be seen that if the copolymer (A) and the polyoxypropylene polymer (B) are blended and used as a paint, there can be obtained a coating having physical properties which are markedly improved over those of the component (A) or the component (B) alone. As apparent from the comparison between Example 8 and Example 9, and Comparative Example 9 and Comparative Example 10, the addition of the component (C) greatly improves the physical properties of a coating and also greatly improves storage stability and viscosity stability.

While the invention has been described in detail and with reference to specific embodiments thereof, it will be apparent to one skilled in the art that various changes and modifications can be made therein without departing from the spirit and scope thereof.

What is claimed is:

1. A curable composition which comprises:
(A) a copolymer having silicon-containing functional groups capable of crosslinking by forming siloxane bonds and whose molecular chain consists substantially of:
  (1) at least one monomeric unit selected from the group consisting of an alkyl acrylate ester monomeric unit and an alkyl methacrylate ester monomeric unit, the alkyl group of each having 1 to 8 carbon atoms; and
  (2) at least one monomeric unit selected from the group consisting of an alkyl acrylate ester monomeric unit and an alkyl methacrylate ester monomeric unit, the alkyl group of each having at least 10 carbon atoms;
(B) an oxyalkylene polymer having silicon-containing functional groups that are capable of crosslinking by forming siloxane bonds; and
(C) at least ne compound selected from the group consisting of:
  (i) a hydrolyzable organic silane monomer represented by the formula (I)

$$R^1{}_{4-n}SiX_n \tag{I}$$

wherein X is a hydrolyzable group, $R^1$ is a monovalent organic group having 1 to 18 carbon atoms, n is an integer of 1 to 4, and each $R^1$ or X can be the same or different when two or more $R^1$ or X groups are attached,
  (ii) a partial hydrolysis condensate of the organic silane monomer represented by the formula (I), and
  (iii) an orthoorganic acid ester represented by the formula (II):

$$R^2C(OR^3)_3 \tag{II}$$

wherein $R^2$ is a hydrogen atom or a methyl group, $R^3$ is a monovalent organic group having 1 to 8 carbon atoms, and each $R^3$ is the same or different.

2. A curable composition as in claim 1, wherein the monomeric unit (1) of copolymer (A) is represented by formula (III)

where $R^4$ is alkyl of 1 to 8 carbon atoms; and $R^5$ is hydrogen or methyl.

3. A curable composition as in claim 1, wherein the monomeric unit (2) of copolymer (A) is represented by formula (IV)

where $R^5$ is hydrogen or methyl; and $R^6$ is alkyl of at least 10 carbon atoms.

4. A curable composition as in claim 1, wherein the total amount of the monomeric units (1) and (2) in copolymer (A) is 50 weight % or more.

5. A curable composition as in claim 1, wherein the weight ratio of the monomeric units (1):(2) is 95:4 to 40:60.

6. A curable composition as in claim 1, wherein a copolymer (A) has a number average molecular weight of 500 to 100,000.

7. A curable composition as in claim 1, wherein said oxyalkylene polymer (B) has a repeating unit of formula $-R^{10}-O-$, wherein $R^{10}$ is a divalent hydrocarbon group having 1 to 8 carbon atoms.

* * * * *